US007197332B2

(12) United States Patent
Andersson et al.

(10) Patent No.: US 7,197,332 B2
(45) Date of Patent: Mar. 27, 2007

(54) MULTI-FUNCTION TWO PANEL ELECTRONIC DEVICE WITH 360° RELATIVE MOTION

(75) Inventors: Tage Andersson, Copenhagen (DK); Katja Kjeldsen, Copenhagen (DK); Benny Matthiassen, Roskilde (DK); Ole Loftlund Dam, Copenhagen (DK); Totti Helin, Helsinki (FI); Juha Kuivas, Oulu (FI); Pekka Paakkonen, Jaali (FI); Ilpo Kauhaniemi, Vantaa (FI)

(73) Assignee: Nokia Corporation, Epsoo (FI)

( * ) Notice: Subject to any disclaimer, the term of this patent is extended or adjusted under 35 U.S.C. 154(b) by 0 days.

(21) Appl. No.: 11/026,402

(22) Filed: Dec. 30, 2004

(65) Prior Publication Data

US 2005/0261040 A1 Nov. 24, 2005

Related U.S. Application Data

(63) Continuation-in-part of application No. 10/829,415, filed on Apr. 21, 2004.

(51) Int. Cl.
*H04B 1/38* (2006.01)

(52) U.S. Cl. ............... 455/557; 455/556.1; 455/556.2; 455/575.3; 16/361; 16/366; 361/814; 361/679

(58) Field of Classification Search ............. 455/557, 455/556.1, 556.2, 575.3; 16/361, 366; 361/814, 361/679
See application file for complete search history.

(56) References Cited

U.S. PATENT DOCUMENTS

| 5,494,447 | A  | * | 2/1996  | Zaidan ................. 439/31 |
| 5,983,073 | A  | * | 11/1999 | Ditzik ................ 455/11.1 |
| 5,987,704 | A  | * | 11/1999 | Tang .................... 16/354 |
| 6,788,527 | B2 | * | 9/2004  | Doczy et al. .......... 361/680 |
| 2004/0207568 | A1 | * | 10/2004 | Ooshima et al. ....... 345/1.1 |
| 2005/0155184 | A1 | * | 7/2005  | Kayl ................... 16/366 |

* cited by examiner

*Primary Examiner*—Danh Cong Le
(74) *Attorney, Agent, or Firm*—Perman & Green, LLP

(57) ABSTRACT

A multi-function electronic device is designed to provide a wide variety of functions. The device consists of two panels attached for relative movement by a hinge. The hinge provides a range of movement of a full 360°. The various functions are accessed by moving the relative position of the panels from 0°, to 165°, to 180°, to 300°, to 360°. Particular functions are correlated to panel orientations which ergonomically suit the selected functions.

21 Claims, 9 Drawing Sheets

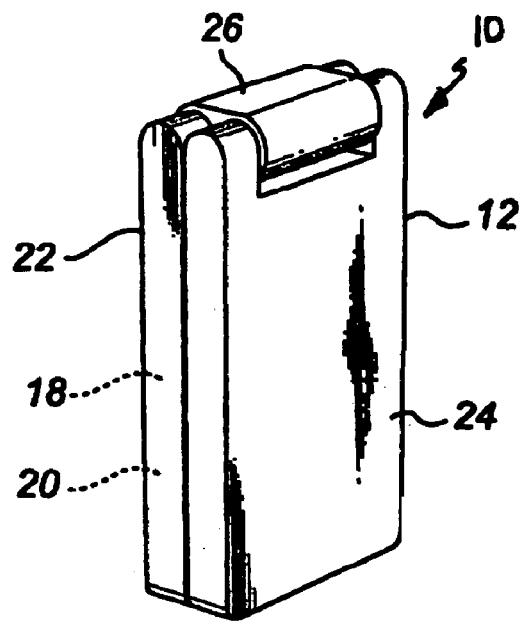
Fig. 1
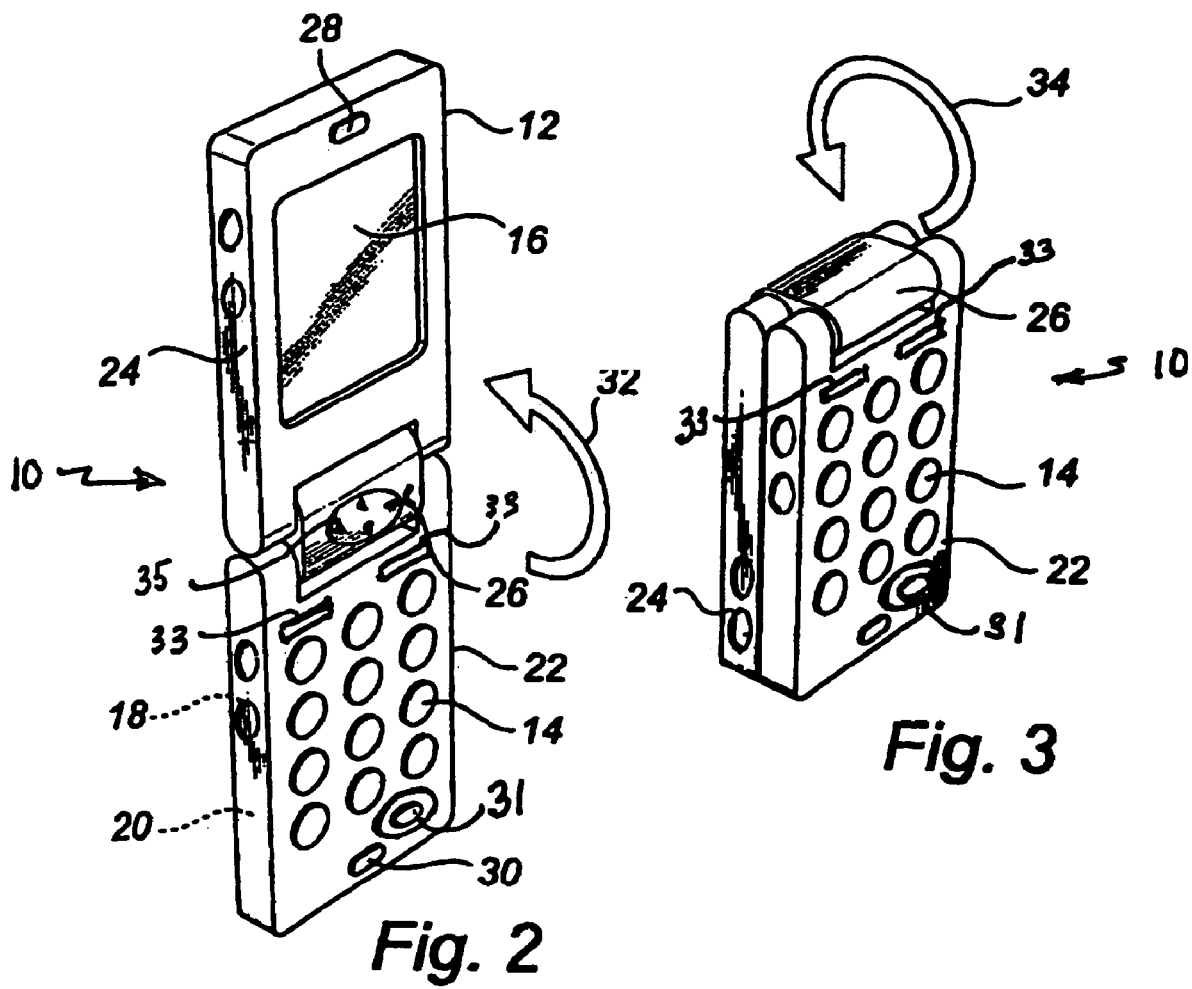
Fig. 2
Fig. 3

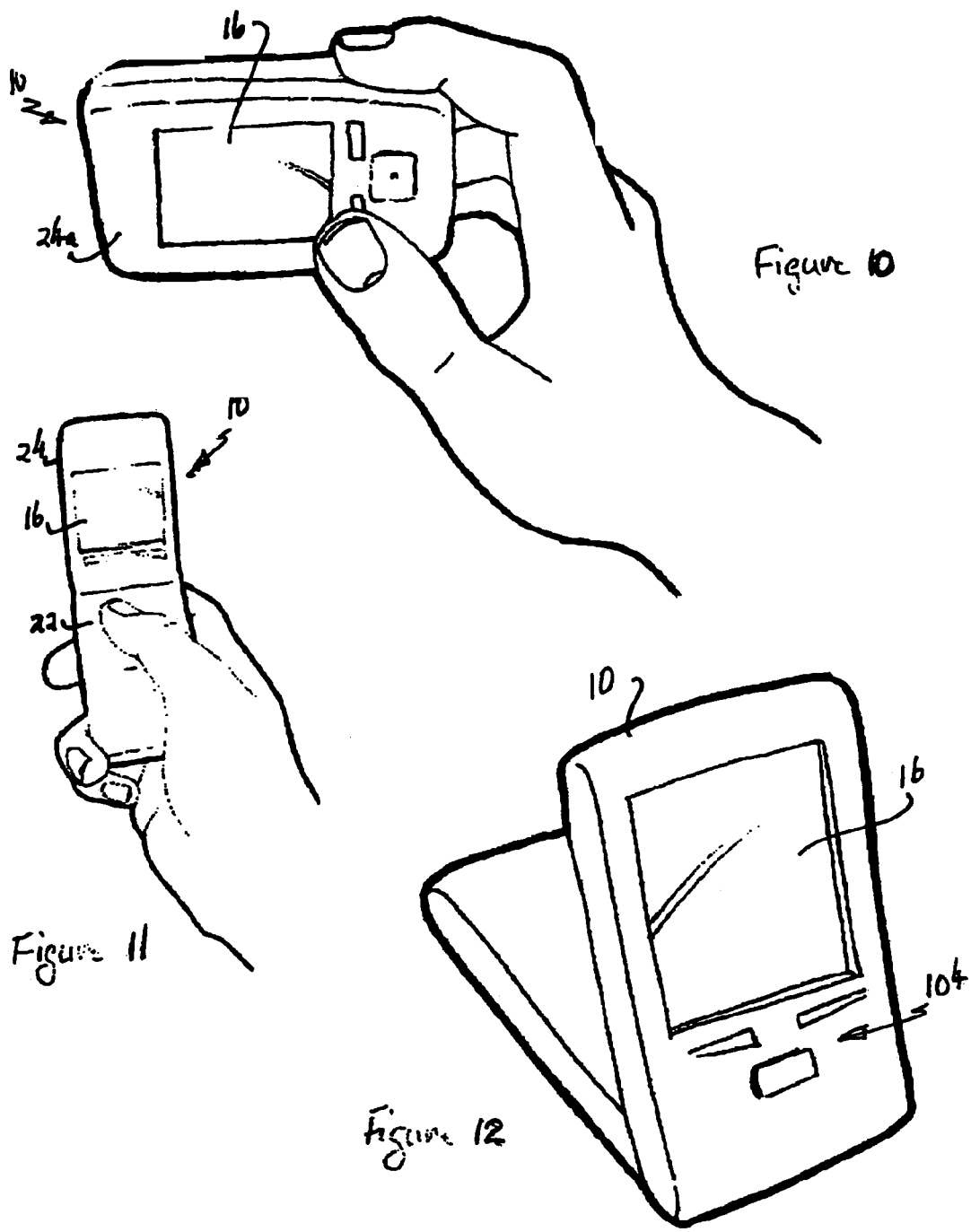

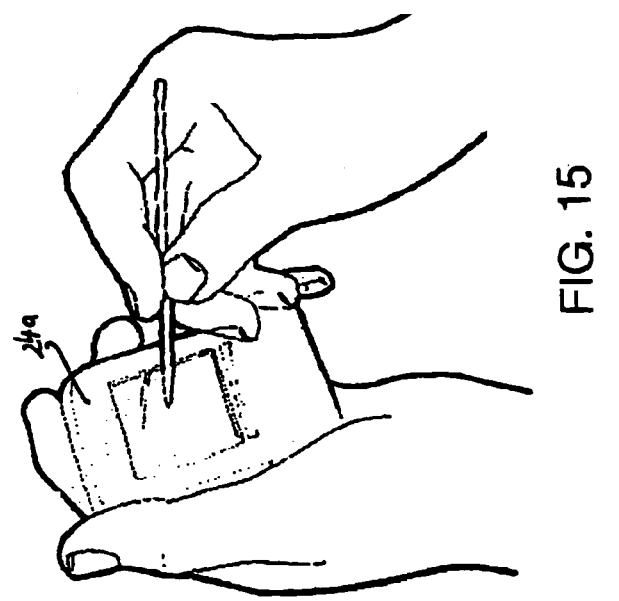
FIG. 15
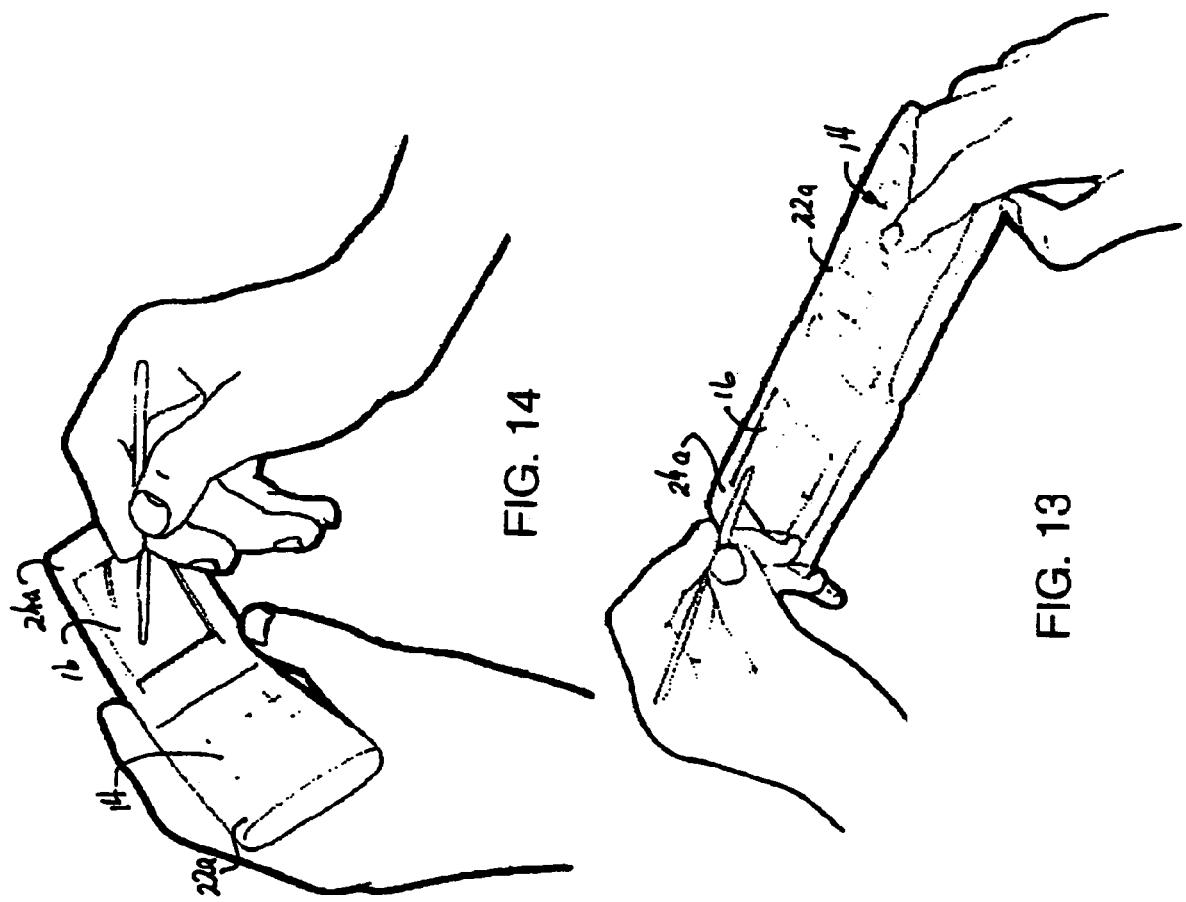
FIG. 14
FIG. 13

MULTI-FUNCTION TWO PANEL ELECTRONIC DEVICE WITH 360° RELATIVE MOTION

CROSS-REFERENCE TO RELATED APPLICATIONS

This application is a continuation-in-part application and claims priority from, U.S. application Ser. No. 10/829,415 filed on Apr. 21, 2004, now pending. This application and U.S. patent application Ser. No. 10/829,415 claim priority to U.S. patent application Ser. No. 10/421,278, filed on Apr. 23, 2003, now pending.

BACKGROUND OF THE INVENTION

1. Field of the Invention

The subject matter of this application relates to an arrangement of components that combines the functions of a multi-use electronic device to optimize their usefulness. More specifically, this application describes a unique arrangement of a two panel electronic device, where the panels are connected by a hinge that allows 360° relative movement, thereby providing multiple operational positions for different functions.

2. Brief Description of Related Developments

Mobile telephones and similar communication devices are rapidly expanding in-use and function. Such devices will soon provide Internet access, personal information management, facsimile, text messaging, picture, video, radio, in addition to telephone communication. To accomplish this there is a need to provide an arrangement of the components in a package that allows the efficient and ergonomically convenient use of the various functions.

With the introduction of multi-function electronic devices, it has become increasingly more difficult to design a user interface that enables the user to access the many types of functions and applications available in small hand held devices. It is a particular challenge to present a simple and efficient means by which the user can communicate with the device for browsing, selecting, and operating amidst the wide array of functional choices. The user interface generally consists of a keypad for entering data and commands and a display screen for presenting information relating to operation of the selected function.

U.S. Pat. No. 6,757,157 is an example of a device which shows a two panel construction in which the two panels are moveable with respect to each other by means of an interconnecting hinge. The hinge is constructed to permit a full range of 360° relative movement between the panels. A display screen is mounted on one panel and a keyboard is constructed in the other panel. At 0° the display screen covers the keyboard in a closed position, an intermediate position allows the keyboard to be used in conjunction with the display and in a fully open position the display is rotated to be reversed to the opposite face of the other panel. The disclosure of the '157 is incorporated herein in its entirety by reference.

Hinges, especially adapted for use in providing relative movement between two panels of a mobile communication device, are described in commonly owned, U.S. patent application Ser. No. 10/829,415, filed Apr. 21, 2004 and Ser. No. 10/421,278, filed Apr. 23, 2003. The disclosures of these applications are incorporated herein by reference in their entirety. Hinges of the type described in these applications would be adaptable to provide the relative motion of the panels of the device of this invention.

It is a purpose of this invention to use a two panel construction to arrange the components of a multi-use device in the most convenient and useful manner.

SUMMARY OF THE INVENTION

A multi-function electronic device, such as a combination PDA/cellular telephone is designed to provide a wide variety of functions including, personal digital assistant, Internet access, cellular telephone, digital camera, clock, radio, picture frame and others. The device consists of two panels attached for relative movement by a hinge. The hinge provides a range of movement of a full 360°. The various functions are accessed by moving the relative position of the panels from 0°, to 165°, to 180°, to 300°, to 360°. Other positions may be used as functions are added. A microprocessor controller correlates particular functions to preselected panel positions that ergonomically suit the selected functions in response to sensed position and features selected by the user.

Each of the panels is constructed as a housing that encloses the components of the device in various known configurations to provide a wide variety of functions and applications. These, components include, for example a microprocessor, mobile telephone transceiver, PDA, display driver firmware, display memory and other processor components depending on the features offered to the user.

In accordance with one aspect of the invention, a display screen and keyboard are arranged on a front side of each panel on opposite sides of the hinge of a two panel mobile communications terminal. The hinge allows a full 360° relative movement between the two panels. Functional components are enclosed within the panels for providing mobile communications, digital camera, and notepad features. These features are enabled by a microprocessor when the relative positions of the panels are at 165°, 180°, and 360°. The display screen is capable of providing a display associated with each of the features, for example data display for mobile communications, touch sensitive display for notepad and view finder display for digital camera.

In accordance with a further aspect of this invention the notepad and camera features are enabled in the 360° position. Mobile communications are enabled in the 165° position and notepad and mobile communications are available in the 180° position.

In accordance with another aspect of the invention, a primary display screen and primary keyboard are arranged on a front side of each panel on opposite sides of the hinge of a two panel mobile communications terminal. In addition, the back side of each panels is also used for providing a secondary display and secondary keyboard or keypad. The hinge allows a full 360° relative movement between the two panels. Functional components are enclosed within the panels for providing mobile communications, digital camera, notepad features, PDA functions, clock radio and Internet access. These features are enabled by a microprocessor when the relative positions of the panels are at 360°, 300°, 180°, and 165°. The primary and secondary display screens are capable of providing a display associated with some or all of the features, for example data display for mobile communications, clock radio, and Internet, touch sensitive display for notepad and view finder display for digital camera. The keyboard and keypad are capable of entering data associated with some or all of the features.

In accordance with another aspect of this invention, the microprocessor controller receives signals from sensors indicating the relative positions of the panels and the controller enables selected features in response to these positions. Individual features are selected by the user by operation of function buttons mounted on the panels.

In accordance with another aspect of this invention a primary display screen is mounted on a front surface of the first panel of a two panel multi-function device and is adapted to display data relating to the functions, such as, for example, mobile communications, personal data assistant (PDA), notepad, clock radio, Internet, and other data displays depending on the operational selection of the user and the relative position of the panels. A primary keyboard is provided on the front surface of the second panel located on the opposite side of the hinge. The primary keyboard provides a means of inputting data for use in telephone functions, PDA functions, and other functions as necessary. Appropriate function buttons are also provided on one or both of the first and second panels to facilitate browsing and selection of menu items displayed on the display screen. A secondary display screen is mounted on the back surface of the second panel. A secondary keypad and grouping of function buttons are provided on the back side of the second panel. A camera is mounted on the back surface of the first panel for operative use with either the primary or secondary displays.

In accordance with another aspect of the invention a camera lens is mounted for use on the back surface of the first panel and may be used either in the closed, 0°, position in association with the secondary display panel or in an open position, such as in the range of 90° to 180° in association with the primary display panel. Camera usage is optimized in the 0° position.

In accordance with another aspect of the invention a free standing mode is provided at approximately 270°–300° which allows the device to be placed with the primary screen exposed in an easily viewable position and the second panel providing a base to allow the device to be supported upright without the need for holding the device. In this free-standing position, the use of the alarm clock and radio function is most convenient. In addition a photo may be displayed for continuing observation in the nature of a picture frame.

In accordance with another aspect of the invention, the device may also be extended flat for table use in the 180° orientation of the panels with the front surfaces of the first and second panels exposed for use and viewing. In this position, the PDA function is most accessible, but all features can also be used. The cellular phone is particularly well adapted for hands free operation in this position. In addition, the function mode in which Internet access is allowed would also be selectable in the 180° position.

In accordance with another aspect of the invention, the functioning of the device is controlled by a microprocessor which monitors the relative position of the first and second panels to identify accessible function and assign functions to the components of the user interface. Certain of the keys provided will be soft keys in that their function will depend on the relative position of the first and second panels and the function selected. In addition, the display driver is designed to switch the display to the viewable display screen in response to movement and position of the panels. The orientation and position of the display on the display screen may also be changed to accommodate the user in the most convenient manner consistent with the function selected. Different menus and data may be displayed depending on the position of the panels and the selected use.

The operable positions of the panels can be expanded or altered for adaptation to alternative or additional modes of operation.

In another aspect of the invention, the hinge used in the device of this application comprises a first hinge member defining a first axis of rotation with the first panel, a second hinge member defining an offset second axis of rotation with the second panel, and synchronizing members which transfer rotational movement of the first panel relative to the hinge to rotational movement of the second panel relative to the hinge. Due to the synchronized movements of the first and second panels, the two panels will fold and unfold smoothly without the risk of jamming the hinge, i.e. the case where one panel unfolds in relation to the hinge while the second panel remains immovable relative to the hinge. Hinges of this type are described in the commonly owned pending patent applications referenced above.

BRIEF DESCRIPTION OF THE DRAWINGS

The device of this invention is explained in more detail below with reference to the accompanying drawing, in which:

FIG. 1 is a perspective view of an embodiment of a mobile communications terminal in a first closed position incorporating features of the present invention;

FIG. 2 is a perspective view of the mobile communications terminal shown in FIG. 1 with housing components moved to a 180° flipped open position;

FIG. 3 is a perspective view of the mobile communications terminal shown in FIG. 1 with housing components moved to a 360 degree fully flipped open and folded position;

FIG. 10 is an illustration of the use of the camera feature of an embodiment of this invention;

FIG. 11 is an illustration of the use of the camera and other features of an embodiment of this invention;

FIG. 12 is an illustration of the use of the free standing feature of this invention; and FIGS. 13–15 are illustrations of the use of the notepad feature of this invention.

DETAILED DESCRIPTION OF THE PREFERRED EMBODIMENT(S)

Figure 4A:
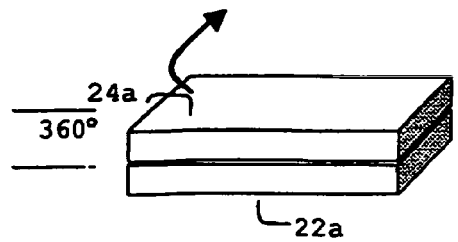
FIGS. 4a–4f are schematic perspective views of the device showing an assortment of positions of the panels of the device of this invention.

A multifunctional device 10, for example a combination PDA cellular telephone incorporating features of the present invention is illustrated in the figures. Although the present invention will be described with reference to the embodiments shown in the drawings, it should be understood that the present invention may have many alternate forms. In addition, any suitable size, shape or type of elements or materials could be used.

A multi-function electronic device, such as a combination PDA/cellular telephone is designed to provide a wide variety of functions including, personal digital assistant, Internet access, cellular telephone, digital camera, clock, radio, picture frame and others. As shown schematically in FIGS.

Figure 4B:
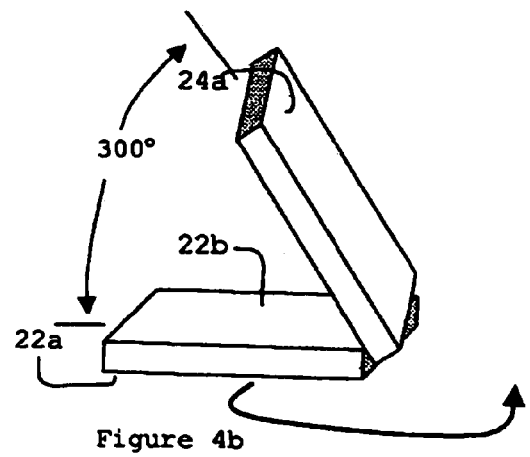
Figure 4C:
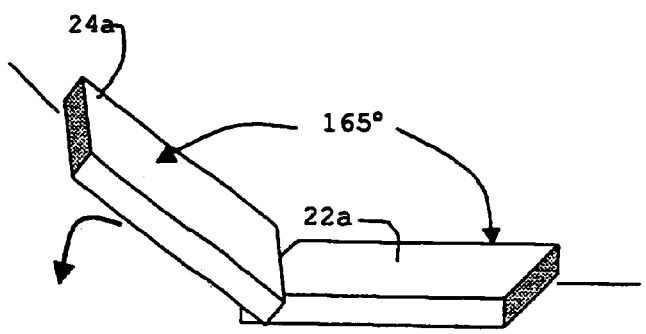
Figure 4D:
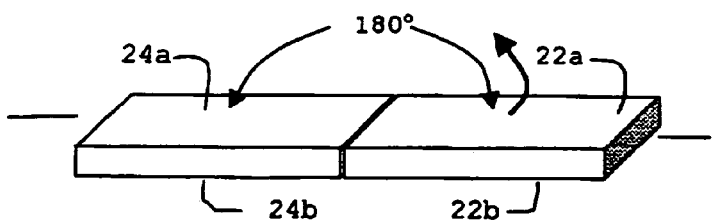
Figure 4E:
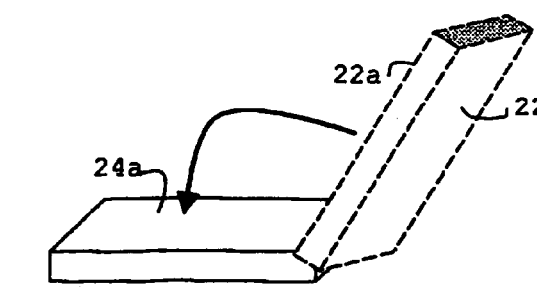
Figure 4F:
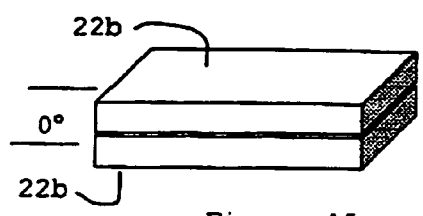
Figure 5:
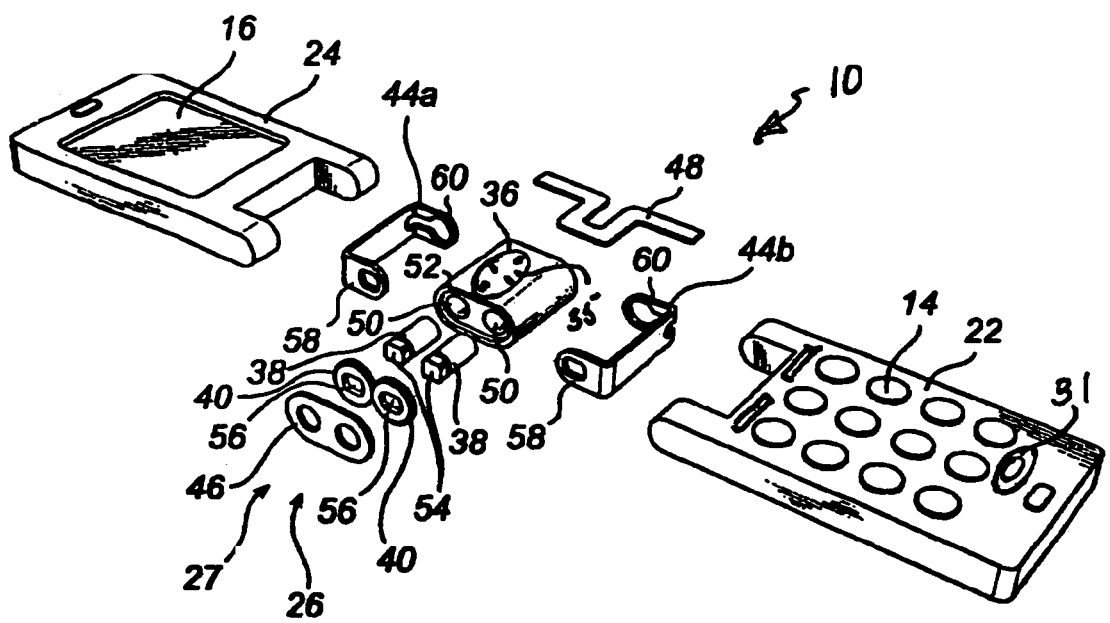
FIG. 5 is an exploded perspective view of the device shown in FIG. 1.

4a–4f, the device consists of two panels 22 and 24 attached for relative movement by a hinge, see FIG. 5. The hinge provides a range of movement of a full 360°. The various functions are accessed by moving the relative position of the panels 22 and 24, for example as shown in FIGS. 4a–4f, from 0°, to 165°, to 180°, to 300°, to 360°. Other positions may be used as functions are added. Particular functions are correlated to panel orientations or positions, wherein the panels and components are arranged so that the user and the device interact most efficiently.

Each of the panels 22 and 24 is constructed as a housing that encloses the components of the device in various known configurations to provide a wide variety of functions and applications. These components include, for example a microprocessor, mobile telephone transceiver, PDA, display driver firmware, display memory and other processor components depending on the functions offered to the user.

For ease of description and illustration, the panels 22 and 24 are generally designated in this application, as a first panel 22 located to the left of the user and a second panel 24 located to the right of the user. Each of the panels have front and back surfaces 22a, 24a, 22b and 24b respectively with the front surface being the surface facing the user in the fully open position of 180°, see FIG. 4d. Each of the panels is constructed with various forms of a system of components that comprise the user interface of the device.

In the embodiment shown in FIGS. 1–3, the multifunction device 10 comprises a mobile communications terminal, such as a mobile telephone. In alternate embodiments, the mobile communications terminal could comprise any suitable type of mobile communicator, such as a device which comprises a pager function or a text transmission function. The mobile communications terminal 10 includes a digital camera feature 31.

Referring also to FIG. 2, the mobile communications terminal 10, in the embodiment shown, generally comprises a housing 12, a keypad 14, a display 16, a transceiver 18, a battery 20 and other components conventional to a mobile telephone, such as a microprocessor and an antenna. The housing 12 generally comprises a first panel 22, a second panel 24, and a connection 26 which movably connects the second panel 24 to the first panel 22. In the embodiment shown, the keypad 14 is connected to the first panel 22 of the housing. The display 16 is connected to the second panel 24 of the housing. The various electronic components of the terminal 10 could be located in any one or more of the housing panels 22 and 24, interconnected through connection 26.

Referring particularly to FIGS. 1–3, the housing 12 is movable into at least three different configurations. FIG. 1 shows the housing 12 in a closed, folded first configuration. In this closed, folded first configuration the first and second panels 22, 24 are located adjacent each other with the display 16 and keypad 14 facing each other in a protected position. This provides a compact folded configuration wherein the keypad 14 and display 16 are not readily accessible to the user. In an alternate embodiment, the first panel 22 could comprise the display 16.

FIG. 2 shows the housing 12 in the first open position. More specifically, the connection 26 allows the second panel 24 of the housing to be flipped open about 180 degrees relative to the first panel 22 of the housing as indicated by arrow 32. In the embodiment shown, the second panel 24 is substantially aligned with the first panel 22 and the connection 26. However, in alternate embodiments, the first open position could comprise the second panel 24 being located at an angle of less than 180 degrees, such as in the range of 160° to 170° for example, or preferably at 165°. This first open position allows the user to locate a speaker or sound transducer 28 at the user's ear and a microphone 30 proximate the user's mouth.

FIG. 3 shows the housing 12 in a second open position. More specifically, the connection 26 allows the second panel 24 of the housing to be folded over about another 180 degrees relative to the first panel 22 of the housing as indicated by arrow 34. In this fully open, 360° flipped position, the first and second panels 22, 24 are collapsed with their back surfaces 22b and 24b facing each other in a reverse orientation relative to the closed, folded position shown in FIG. 1. In this second open position, the keypad 14 is located at the exterior facing side of the first panel 22 and the display 16 is located at the opposite exterior facing side of the second panel 24. In the folded fully open position shown in FIG. 3 a user can use the mobile communications terminal 10 in this collapsed, folded configuration.

In the embodiment of this invention, as shown in FIGS. 2 and 3, a camera is contained within panel 22 with a lens 31 providing a viewing range extending outward from the front of panel 22. In addition, at least a portion of display 16 is operable as a touch sensitive display configured to provide a notepad mode of operation. Function keys and buttons, such as browser key 35 and buttons 33, are also provided for operation of features available in a particular position of the panels. In addition additional keys 27, such as shown at the sides of panels 22 and 24 in FIGS. 2 and 3, may be provided. Some or all of the keys 27, 33 and 35 may be soft keys that may be assigned different values depending on the position of the panels and the function selected. Browser key 35 is shown integrated into the hinge 36.

Referring to FIG. 5, an exploded perspective view of an alternative embodiment of the mobile communications terminal 10 is shown. The connection 26 generally comprises a synchronized rotation, multi-axis hinge 27 and an electrical flex conductor 48. Flex connector 48 is used to interconnect the components of the mobile communications terminal 10 across the connection 26. Flex connector 48 can also be used to connect electrical components constructed in the hinge 27, such as browser key 35. The hinge 27 generally comprises a hinge frame 36, two hinge modules or pins 38, synchronizing gears 40, two frame members 44a, 44b, and a dust cover 46. The hinge frame 36 has a general oval side profile. The hinge frame 36 comprises two parallel pin receiving areas 50. The hinge frame 36 also comprises a recess 52 at the entrance to the pin receiving areas 50.

The hinge modules 38 are rotatably located in the receiving areas 50. Front portions 54 have a keyed shape to be received in key shaped apertures 56 of the gears 40. The gears 40 are interlockingly connected to each other by their teeth and grooves. With the gears 40 mounted on the front portions 54 of the hinge modules 38, the gears 40 are fixedly attached to the hinge modules 38 for synchronized rotation of the hinge modules 38 relative to each other. The gears 40 are located in the recess 52 of the hinge frame 36. The gears 40 form synchronization members to assist in synchronizing movement of the hinge frame 36 relative to movement of the first and second sections 22, 24 relative to each other. The hinge modules could be commercially available products. The hinge modules could comprise an internal detent system.

The front portions 54 of the hinge modules 38 are also connected to ends 58 the frame members 44a, 44b. Specifically, a first one of the hinge modules 38 is fixed to the front portion 54 of the first frame member 44a and, a second one of the hinge modules 38 is fixed to the front portion 54 of the second frame member 44b. The dust cover 46 is preferably located between the gears 40 and the frame members 44a, 44b. The dust cover 46 helps to prevent dust or debris from entering into the receiving areas 50 of the hinge frame 36 and interfering with the interlocking engagement of the teeth and grooves of the gears 40. In the embodiment shown, opposite ends 60 of the frame members 44a, 44b are pivotably connected to pivot sections extending from the hinge frame 36.

The first frame member 44a is fixed to the first section 22 of the housing. The second frame member 44b is fixed to the second section 24 of the housing.

Figure 6:
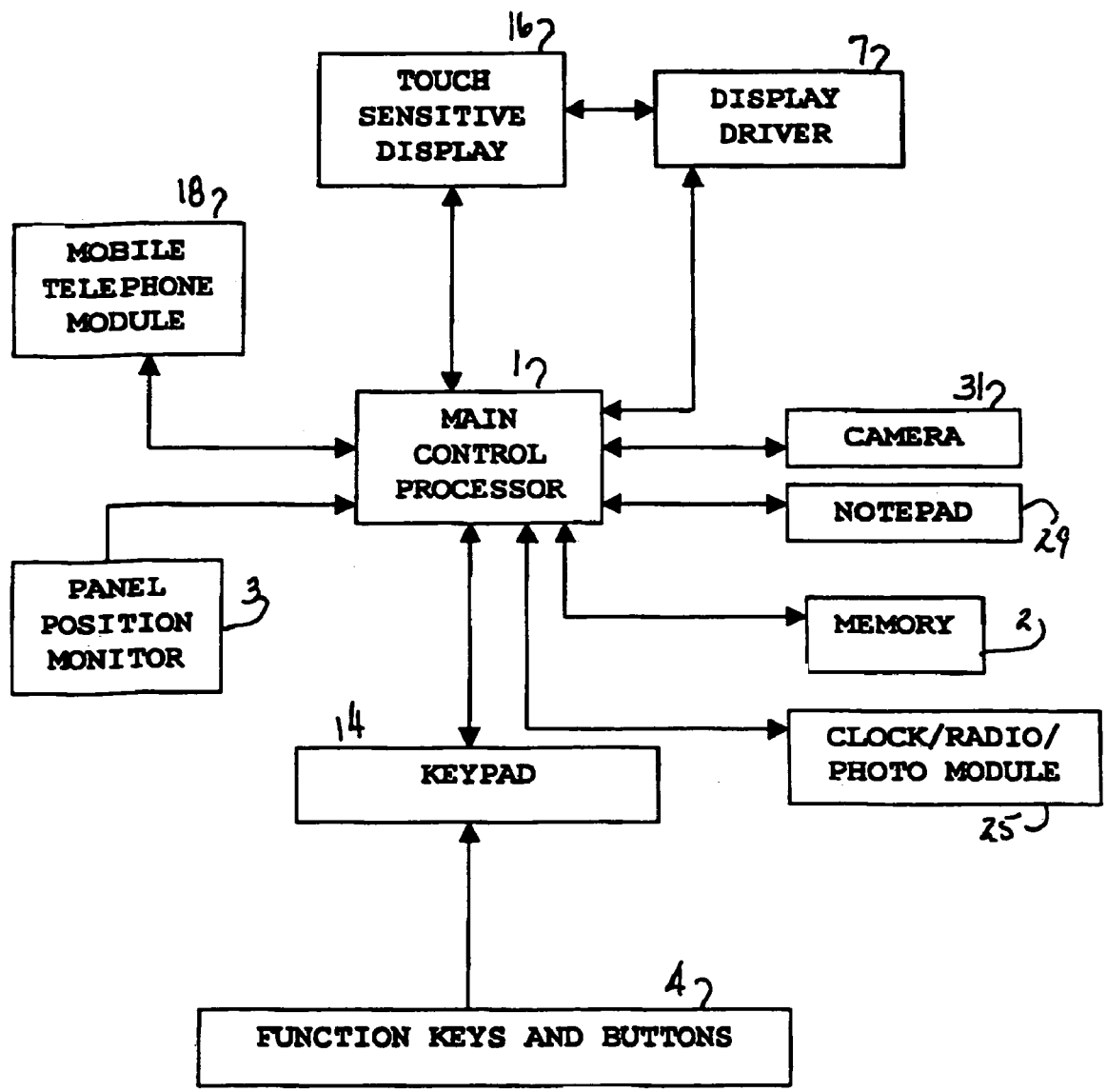
FIG. 6 is a block diagram of the components providing features in the embodiment of FIG. 1.

As shown in FIG. 6, the multifunction communication terminal 10 of FIGS. 1–3, comprises a system of components that are operatively interconnected to provide the combined functions of a camera 31, notepad 29, and mobile telephone 18. A main control processor 1 is supported by a memory 2 and processes data and commands from a mobile telephone module 18 and a notepad module 29 and other user interface components. The user interface of the device 10 of FIGS. 1–3 includes a display 16, operable for both data and image display as well as touch sensitive operation, and a keypad 14 in association with function keys and buttons 4 (such as 33 and 35 in FIGS. 2 and 3). The display 16 has an associated display driver 7.

The camera, telephone and notepad features are arranged for use in predetermined positions of the panels 22 and 24. Additional panel orientations are shown in FIGS. 4a–4b. The positions are selected to best suit the ergonomics of the particular functions. The microprocessor controller 1 receives position data from panel monitor 3 which, utilizing sensors in connector 26, generates signals indicative of the panel positions. With this data main control processor 1 adjusts the functioning of device 10 accordingly. For example, in the closed position shown in FIG. 1 all features are disabled and the device is off or in standby mode. The camera feature is enabled in the 180° position of FIG. 2 or the 360° position of FIG. 3. In the position of FIG. 2, display 16 operates as the view finder of the camera in a portrait orientation directed at the user, as illustrated in FIG. 11. By appropriate focusing this could be used for video calls with the picture of the user being shown and transmitted. In the 360° position, the camera can be used in a more conventional manner with the camera view away from the user, as shown in FIG. 10. Display 16 again operates as a view finder to show the field of view of the camera 31, but in landscape orientation.

Notepad 29 may be enabled in the 180° position. A function button, such as shown at 33 in FIG. 2, may be used to indicate to the processor 1, that the notepad feature is selected. Processor 1 would then enable the note pad module 29 and display 16 would be touch sensitive. This can be a pointer operated sensitivity allowing free hand markings for a true note pad feel. In the 180° position the device can be oriented for operation with the keypad 14 at the right or left hand side, as shown in FIGS. 13 and 14. This also allows convenient operation for either right or left handed users. The flat nature of this orientation allows the notepad function to be used on a table or other flat surface. The notepad feature is also enabled in the 360° position, as shown in FIG. 11. The display 16 is oriented on the back of the folded unit, shown in FIG. 3 and in the reverse position may be conveniently hand held for use as a notepad, as shown in FIG. 15.

In a further embodiment, the mobile communications terminal 10 of FIGS. 1–3 is constructed with a clock radio, photo module 25 which provides a clock function in associated with a radio function for alarm or listing purposes. A photo could also be displayed either as a temporary or extended display. This feature is enabled in an intermediate position, for example approximately 300°, as shown in FIG. 4b and FIG. 12. In this position panel 22 operates as a base with panel 24 extending upward having its surface 24a in a conveniently viewable orientation. As shown in FIG. 12, surface 24a is constructed with the display 16 in full view. In this position main control processor 1, enables the clock radio photo module 25 and causes the display of time, radio selection, or photo.

Figure 7:
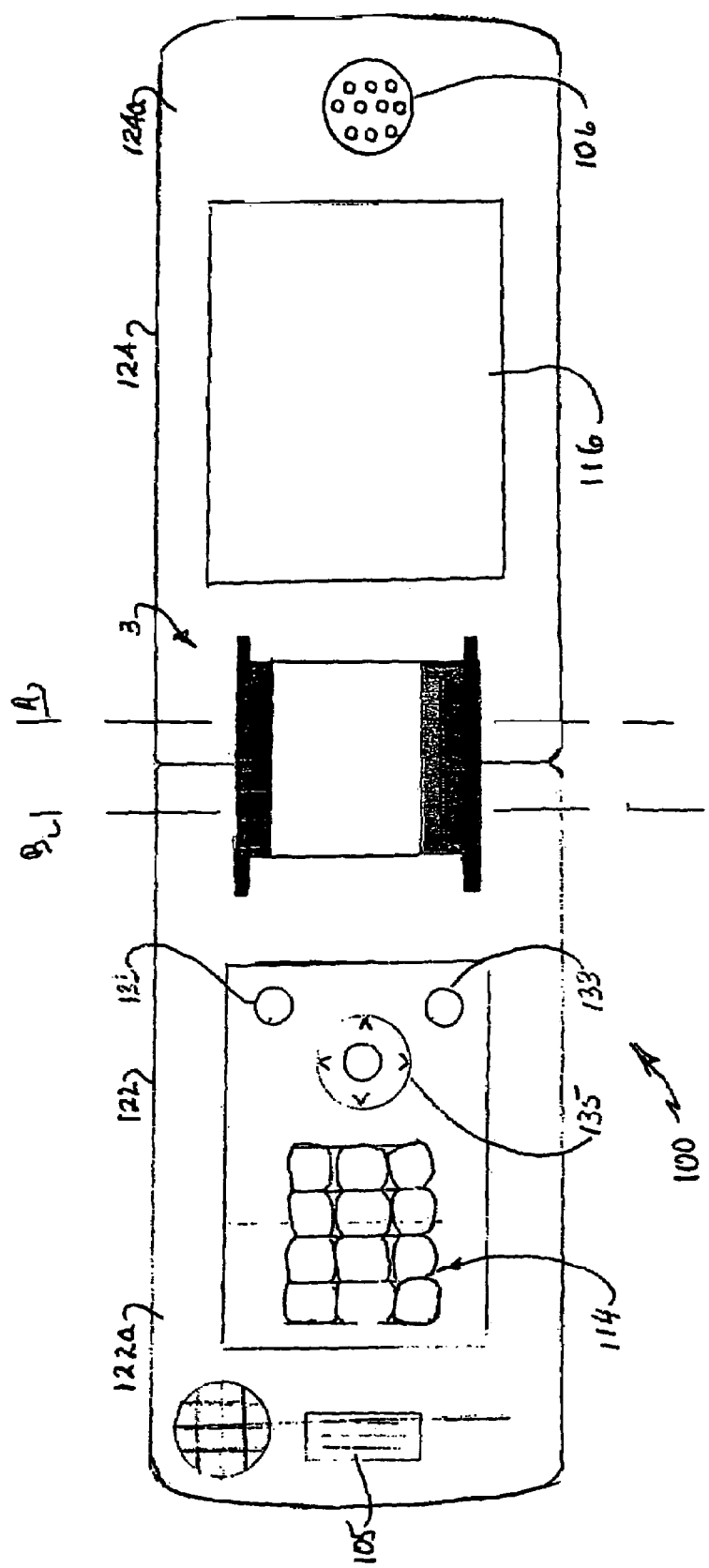
FIG. 7 is a front plan view of another embodiment of a device incorporating features of the subject invention.
Figure 8:
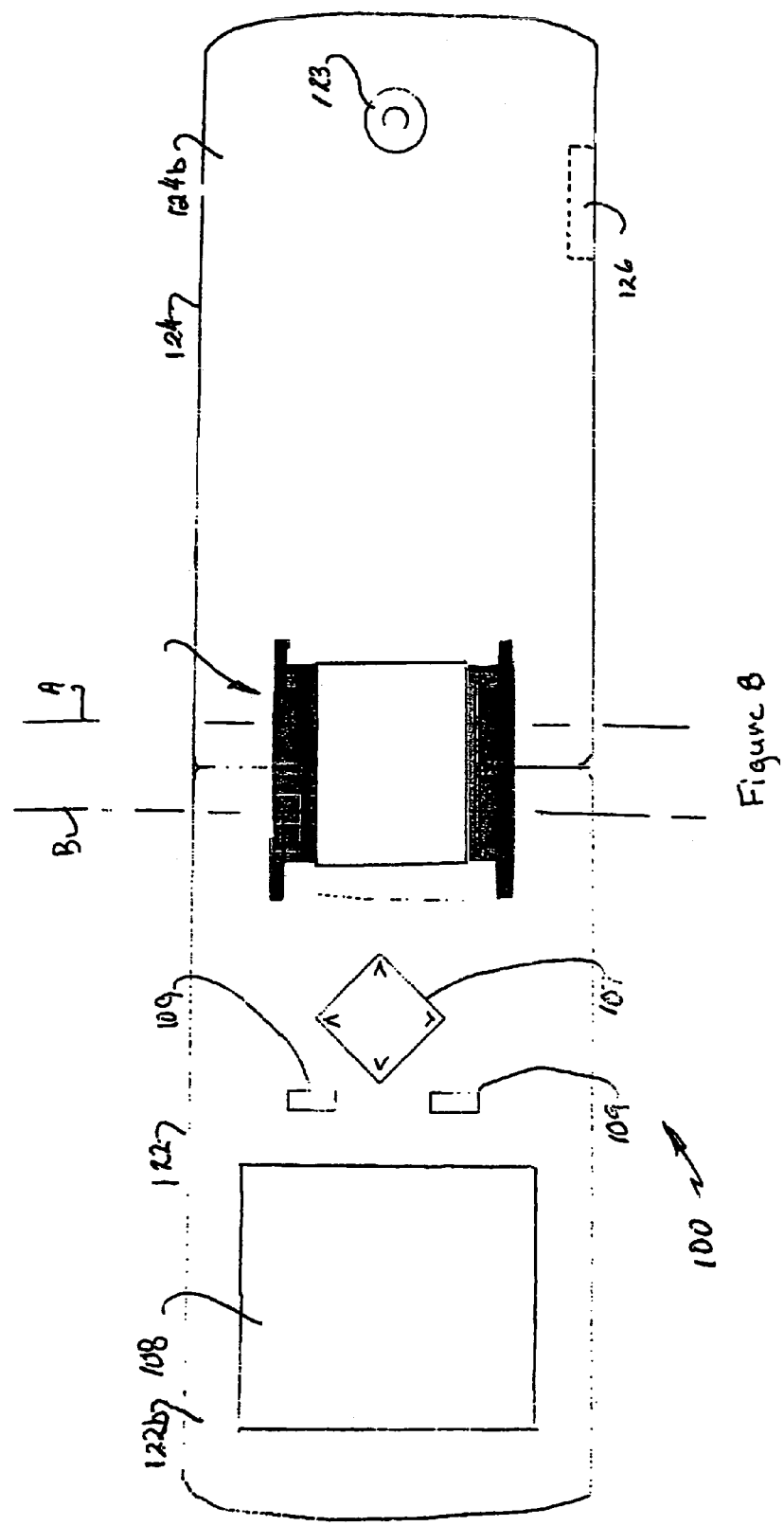
FIG. 8 is a back plan view of the device shown in FIG. 7.
Figure 9:
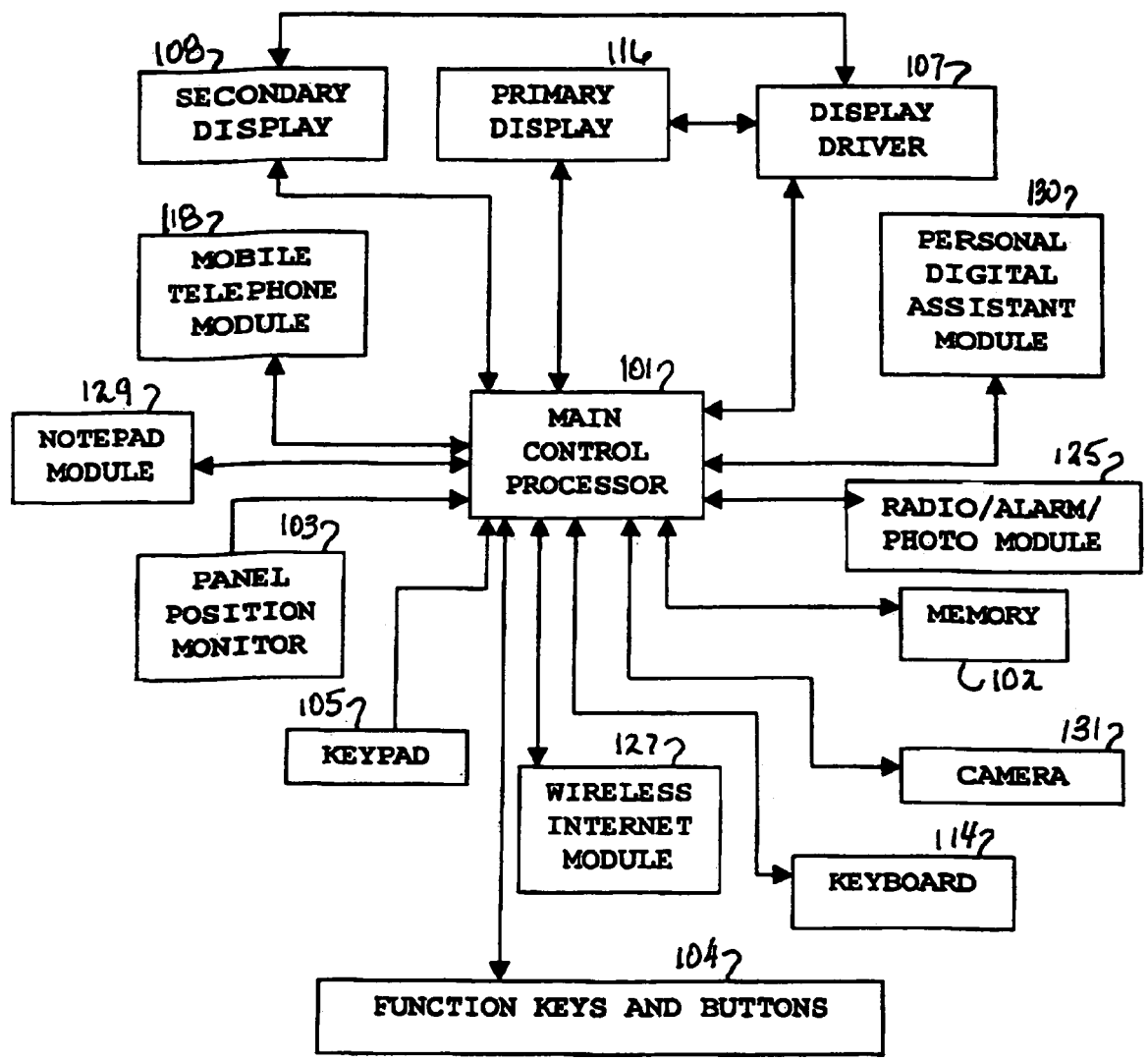
FIG. 9 is a block diagram of the system of the device shown in FIG. 7.

In another embodiment, a multi-function device 100 is constructed as a combination personal digital assistant and a mobile communication terminal, as illustrated in FIGS. 7–9. PDA/mobile terminal 100 is constructed with a two panel housing that encloses the components of the device 100 in the general configuration illustrated in FIG. 9 to provide a wider variety of functions and applications. The device is constructed having a first panel 122 and a second panel 124. First panel 122 has a front surface 122a and a back surface 122b. Second panel 124 has a front surface 124a and a back surface 124b.

As shown in FIG. 7 the front surfaces 122a and 124a are shown in the flat 180° position. A primary display screen 116 is mounted on front surface 124a of the second panel 124 and is constructed to provide a user interface component adapted to display data relating to the various functions provided, such as, for example, communications, a PDA, note pad and other data displays depending on the operational selection of the user and the relative position of the panels. A primary keyboard 114 is provided on the front surface 122a of the first panel 122, to provide a means of inputting data for use in telephone functions, PDA functions, and other functions as necessary. Appropriate function buttons 104, such as soft keys 109, 133 and browser keys 107,135 in FIGS. 7 and 8 are also provided to facilitate selection of features and browsing through menus associated with a particular feature.

In FIG. 8, the back side of the device 100 of FIG. 7 is illustrated having back side 122b and 124b. A secondary display screen 108 is mounted on the back surface 122b of the first panel 122. Display 108 may be conveniently used in the closed (0°) position (see FIG. 4f). A secondary keypad or grouping of function buttons, such as buttons 109 and browser key 107, are provided on the back side 122b for use with the camera and other functions accessible in the various positions in which the back of the second panel is exposed, such as the 0° position.

A camera lens 123 is mounted for use on the back surface 124b a of second panel 124 and may be used either in the closed, 0°, position in association with the secondary display panel 108 or in an open position, such as in the range of 90° to 180° in association with the primary display panel 116. Camera usage is optimized in the 0° position. A receptacle connector 126 may be provided for the connection of an accessory flash unit (not shown).

A free standing mode is provided at approximately 270°–300° which allows the device to be placed with the primary screen exposed in an easily viewable position and the second panel providing a base to allow the device to be supported upright without the need for holding the device. In this free-standing position, the use of the alarm clock and radio function is most convenient.

The device may also be extended flat for table use in the 180° orientation of the panels with the front surfaces of the first and second panels exposed for use and viewing. In this position, the PDA function is most accessible, but all features can also be used. The cellular phone is particularly well adapted for hands free operation in this position. In addition the function mode in which Internet access is allowed would also be selectable in the 180° position.

The functioning of the device 100 is controlled by a microprocessor 101 which monitors the relative position of the first and second panels 122 and 124 to identify accessible functions and assign functions to the components of the user interface. Certain of the keys provided will be soft keys, such as 107,109, and 133 in that their function will be assigned by microprocessor 101, depending on the relative position of the first and second panels and the function selected. In addition, the display driver 107 is designed to switch the display to the viewable primary display screen 116 or secondary display screen 108 in response to movement and position of the panels. The orientation and position of the display on the display screen 116 or 108 may also be changed to accommodate the user in the most convenient manner consistent with the function selected. Different menus and data may be displayed depending on the position of the panels and the selected use.

As shown in FIG. 9, the multifunction communication terminal 100 of FIGS. 7–9, comprises a system of components that are operatively interconnected to provide the combined functions of a camera 131, notepad 129, and mobile telephone 118. A main control processor 101 is supported by a memory 102 and processes data and commands from a mobile telephone module 118 and a notepad module 129, PDA module 130 and other user interface components. The user interface of the device 100 of FIGS. 7–9 includes a display 116 and a keypad 114 in association with function keys and buttons 104 (such as 133 and 135 in FIGS. 2 and 3). The display 116 has an associated driver 107. Display screen 116 is operable in a touch sensitive mode to support the notepad module 118 and a data or image display mode to support other functions. Browser key 107 and soft keys 109 provide a user interface for use in the 0° position of the panels.

In alternate embodiment, a clock/radio/photo module 125 may be provided to offer the function of a radio alarm and photo display function as previously described. In addition a secondary keypad 105 could located on the back side of panel 122 to provide further functionality. In addition Internet access could be provided by a wireless Internet module 127.

The operable positions of the panels can be expanded or altered for adaptation to alternative or additional modes of operation.

The arrangement of the keyboard of panel 22 in FIGS. 2 and 3 and panel 122 in FIGS. 7 and 8 are merely exemplary, and any suitable arrangement of keys and functions, including the types of buttons and keys, is within the scope of the invention.

It should be understood that the above description is only illustrative of the invention. Various alternatives and modifications can be devised by those skilled in the art with out departing from the invention. Accordingly, the present invention is intended to embrace all such alternatives, modifications and variances which fall with the scope of the appended claims.

The invention claimed is:

1. A mobile multi-function electronic device comprising:
  a first panel having front and back surfaces;
  a second panel having front and back surfaces, said second panel connected to the first panel by means of a hinge, said hinge constructed to allow the relative movement of said first and second panels in a range of positions from 0° at which said front surfaces of said panels are facing each other to 360° at which said back surfaces of said panels are facing each other;
  a plurality of electronic components arranged within the panels to provide multiple functions selectable by a user;
  a microprocessor in said device connected to enable certain electronic components to provide at least one of said multiple functions as selected by the user depending on the relative position of the first and second panels and the user selection;
  wherein the relative position of the panels for which a particular one of said multiple functions may be enabled is determined by optimizing ergonomic functionality; and
  said mobile multi-function electronic device further comprising:
  a primary display screen constructed in the front surface of the first panel to allow the user to view data and images as required by the selected function;
  a keyboard constructed in the front surface of the second panel to allow a user to enter data and commands as required by the selected function;
  a mobile communications module contained in the panels and connected to the microprocessor to provide a mobile communications function;
  a digital camera module constructed in the device and connected to the microprocessor to allow the user to capture digital images in operative association with the display screen; and
  a note pad module constructed in the device and connected to the microprocessor to allow the user to enter free formed notes.

2. A mobile multi-function electronic device, according to claim 1, wherein said display screen is constructed having at least a portion that is touch sensitive and said notepad module is in operative association therewith.

3. A mobile multi-function electronic device, according to claim 1, wherein the arrangement of the components of the digital camera are optimized for use when the relative position of the panels are at 360°.

4. A mobile multi-function electronic device, according to claim 1 2, wherein the arrangement of the components of the notepad module are optimized for use when the relative position of the panels are at 360° and 180°.

5. A mobile multi-function electronic device, according to claim 1, wherein the arrangement of the components of the mobile communications device are optimized for use when the relative position of the panels are in the range of 160° to 170°.

6. A mobile multi-function electronic device, according to claim 1, further comprising an arrangement of function keys and buttons arranged on said panels and adapted to facilitate the use of said multiple functions, said buttons assigned different functionality by the microprocessor depending on the relative position of the panels and the function selected by the user.

7. A mobile multi-function electronic device, according to claim 1, further comprising:
  a secondary display screen constructed in the back surface of said second panel to allow the user to view data and images as required by the selected function when the relative position of the panels obscures the primary display screen;
  a keypad constructed in the back surface of said second panel to allow the user to enter data and commands as required by the selected function when the relative position of the panels obscures the keyboard; and wherein a lens for the digital camera module is constructed in the back surface of the first panel to provide a field of view extending outward therefrom, and further wherein the arrangement of the components of the digital camera module are optimized for use when the relative position of the panels is at 0°.

8. A mobile multi-function electronic device, according to claim 1, further comprising a clock module constructed in the device and connected to the microprocessor to provide time functions to allow the user to view time information in operative association with the display screen and wherein said clock module is enabled when the relative position of the panels is approximately 300°, said device being supported in free standing position on said front surface of said second panel.

9. A mobile multi-function electronic device, according to claim 1, further comprising a radio module constructed in the device and connected to the microprocessor to provide a radio function to allow the user to listen to radio transmissions and wherein said clock module is enabled when the relative position of the panels is approximately 300°, said device being supported in free standing position on said front surface of said second panel.

10. A mobile multi-function electronic device, according to claim 1, further comprising a personal digital assistant module constructed in the device and connected to the microprocessor to provide a PDA function to allow the user to enter and view data in operative association with the display screen and wherein said PDA module is enabled when the relative position of the panels is approximately 180° or 360°.

11. A mobile multi-function electronic device, according to claim 1, further comprising a photo module constructed in the device and connected to the microprocessor to provide a photo display function to allow the user to view photos in operative association with the display screen and wherein said clock module is enabled when the relative position of the panels is approximately 300°, said device being supported in free standing position on said front surface of said second panel.

12. A mobile multi-function electronic device comprising:
a first panel having front and back surfaces;
a second panel having front and back surfaces, said second panel connected to the first panel by means of a hinge, said hinge constructed to allow the relative movement of said first and second panels in a range of positions from 0° at which said front surfaces of said panels are facing each other to 360° at which said back surfaces of said panels are facing each other;
a plurality of electronic components arranged within the panels to provide multiple functions selectable by a user;
a microprocessor in said device connected to enable certain electronic components to provide at least one of said multiple functions as selected by the user depending on the relative position of the first and second panels and the user selection;
wherein the microprocessor enables a communications function when said panels have a relative position in the range of 160° to 170°;
wherein the microprocessor enables a digital camera function when said panels have a relative position of 360°; and
wherein the microprocessor enables a notepad function when said panels have a relative position of either 180° or 360°.

13. A mobile multi-function electronic device, according to claim 12, wherein the microprocessor enables a personal digital assistant function when said panels have a relative position of either 180° or 360°.

14. A mobile multi-function electronic device, according to claim 12, wherein the microprocessor enables a clock function when said panels have a relative position of approximately 300°.

15. A mobile multi-function electronic device, according to claim 12, wherein the microprocessor enables a radio function when said panels have a relative position of approximately 300°.

16. A mobile multi-function electronic device, according to claim 12, wherein the microprocessor enables a photo display function when said panels have a relative position of approximately 300°.

17. A method of controlling a mobile multi-function electronic device, said device having a first panel having front and back surfaces, a second panel having front and back surfaces, said second panel connected to the first panel by means of a hinge, said hinge constructed to allow the relative movement of said first and second panels in a range of positions from 0° at which said front surfaces of said panels are facing each other to 360° at which said back surfaces of said panels are facing each other, a plurality of electronic components arranged within the panels to provide multiple functions selectable by a user, and a microprocessor in said device connected to enable certain electronic components to provide at least one of said multiple functions as selected by the user depending on the relative position of the first and second panels and the user selection, said method comprising the steps of:
adjusting the relative position of the panels to a position in the range of 160° to 170° and causing said microprocessor to enable a communications function;
adjusting the relative position of the panels to a position of approximately 360° and causing said microprocessor to enable a digital camera function; and
adjusting the relative position of the panels to a position of approximately either 180° or 360° and causing said microprocessor to enable a notepad function.

18. A method of controlling a mobile multi-function electronic device, according to claim 17, further comprising the step of adjusting the relative position of the panels to a position of approximately either 180° or 360° and causing said microprocessor to enable a personal digital assistant function.

19. A method of controlling a mobile multi-function electronic device, according to claim 17, further comprising the step of adjusting the relative position of the panels to a position of approximately 300° and causing said microprocessor to enable a clock function.

20. A method of controlling a mobile multi-function electronic device, according to claim 17, further comprising the step of adjusting the relative position of the panels to a position of approximately 300° and causing said microprocessor to enable a radio function.

21. A method of controlling a mobile multi-function electronic device, according to claim 17, further comprising the step of adjusting the relative position of the panels to a position of approximately 300° and causing said microprocessor to enable a photo display function.

* * * * *

UNITED STATES PATENT AND TRADEMARK OFFICE
CERTIFICATE OF CORRECTION

PATENT NO.       : 7,197,332 B2
APPLICATION NO. : 11/026402
DATED            : March 27, 2007
INVENTOR(S)      : Andersson et al.

It is certified that error appears in the above-identified patent and that said Letters Patent is hereby corrected as shown below:

Title Page, Item (63) "Related U.S. Application Data" should include application no. 10/421,278, filed April 23, 2003.

Signed and Sealed this

Fifteenth Day of July, 2008

JON W. DUDAS
*Director of the United States Patent and Trademark Office*